Jan. 4, 1927. 1,612,948
S. H. SHAW
BUMPER
Original Filed July 13, 1922

INVENTOR
Samuel H. Shaw
BY
his ATTORNEY

Patented Jan. 4, 1927.

1,612,948

UNITED STATES PATENT OFFICE.

SAMUEL H. SHAW, OF NEW YORK, N. Y., ASSIGNOR TO UNIVERSAL SHOCK ELIMINATOR, INC., OF LONG ISLAND CITY, NEW YORK, A CORPORATION OF NEW YORK.

BUMPER.

Original application filed July 13, 1922, Serial No. 574,638. Divided and this application filed August 20, 1926. Serial No. 130,396.

This invention relates to bumpers, so-called, such as are used on motor cars to receive the shock of impact with other cars or obstacles on the road. This invention relates to such articles which are sometimes called impact bars, and more particularly to the type known as spring bar or flat spring bar bumpers, in which the impact shock is absorbed by the resiliency of the bumper as distinguished from the types having a rigid bar with a coil spring or similar attaching device to absorb the shock of impact solely in the attaching means or junction of the device with a rigid part of the vehicle.

More particularly this invention relates to improved features of construction of the resilient or impact flat spring bar having for its objects economy in production, durability, lightening of construction, increased strength, and other features the advantages of which will appear from the more detailed specification. Also a particular feature incident to the practice of my invention is the prevention of slipping of the flat spring bar forming the outer impact member, so as to assure a direct reaction on yielding parts of the bumper by having the impact surface held against up or down slipping on the object with which it contacts.

While the construction embodying my invention realizes several or all of the objects set forth, a particular embodiment hereinafter specifically described, includes a resilient front impact bar which on its outer vertical face has intermediate and marginal surfaces in one plane, with the intervening surface slightly depressed adjacent to the flat raised bands and borders. Such deformation of the outer vertical surface of the spring bar permits a corresponding deformation of the rear surface of the bar, with a resultant equal strength against horizontal impact, with less weight of the bar than if made of plain stock with two parallel plain sides. But in addition it provides a narrow border near top and bottom and an intermediate band, aggregating only a fraction of the total surface which need be ground and polished, and as is usual in the finish of this class of product, the surface, which is nickel-plated, is very materially reduced in area, thus providing a substantial economy in various operations mentioned in manufacture. As this type of bumper is used on the front of automobiles, and also on the rear, they are constantly exposed to the elements and also exposed to rough usage by impact and scraping on objects, so that in minimizing the amount of surface subjected to a fine polish, my construction has many advantages in durability and retaining its appearance in spite of its regular usage, with the obvious economy.

As these bumpers extend either forward or to the rear beyond the other parts of the vehicle, for the object of shielding other parts of the vehicle against accidental impact, the overhanging weight of the bumper subjects the attachment to the rigid part of the vehicle to considerable vertical strain, so that any reduction in weight, without sacrificing the stiffness against impact or without sacrificing resiliency to absorb impact, relieves the other parts of the vehicle as well as the means of attachment, in direct proportion to the saving in weight of the impact bar.

While various modifications may be made in the practice of my invention, and particularly as to the methods of attaching my spring impact bars to the front or to the rear, and a number of variations or modifications have been shown and described in the original application, of which this is a division,—this divisional application relates to bumper bars having a plurality of flat bands or strips, more than two, on the impact face of the bar, and also specifically to such as have upper and lower border bands and an intermediate impact surface area between the bands slightly set back from the plane of the bands. Specific embodiments of the invention are shown in the accompanying drawings, in which:

The spring bar 1 constitutes the main or impact engaging member of the bumper, with the impact face 2. On this impact face a plurality of bands extend longitudinally, and in the particular form shown bands 3 and 4 are near top and bottom with an intermediate band 5, all of which are preferably in the same vertical plane and present slightly outstanding stripes along the front surface of the impact bar from side-to-side of the vehicle, that is wherever the bar is liable to contact with parts of other automobiles or obstacles on the road. Adjacent these outstanding bands the front surface of the impact bar is slightly depressed forming a surface which may be flat as shown and as hereinafter more fully described.

Figure 1:
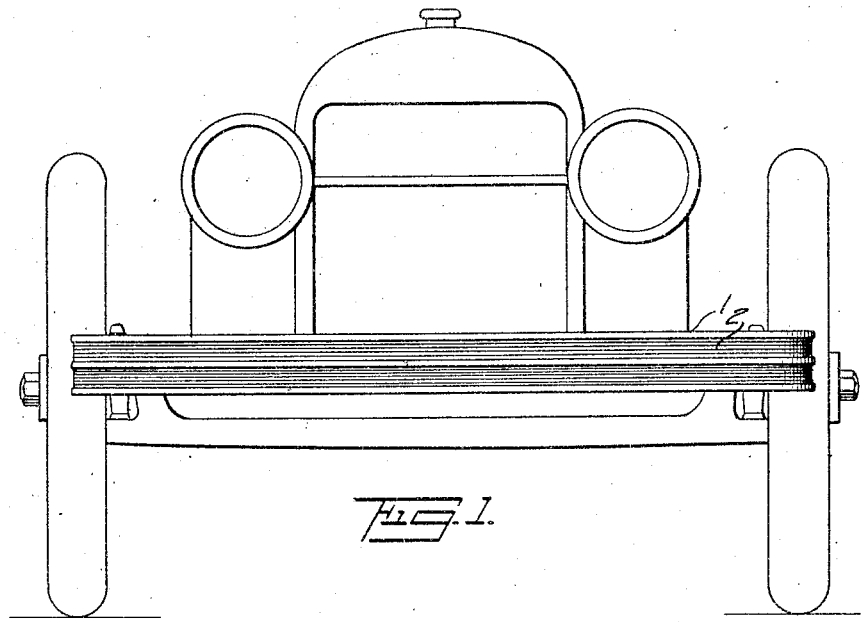
Fig. 1 is an elevation showing a front view of parts of a motor car and equipped with a bumper containing the invention.
Figure 2:
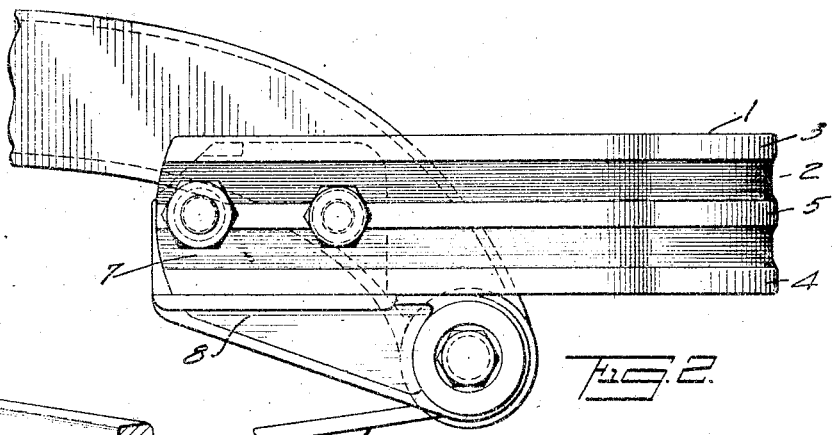
Fig. 2 is a side elevation, on a larger scale, showing the end of a bumper with its attachment to the vehicle frame horn.

When such impact bars have their ends bent back, or bent back with a return-bend as indicated by the shading in Fig. 2, they provide rearwardly extending legs as 7, shown in Fig. 2, providing means of attachment by means of the bracket 8 to the horn of the vehicle frame constituting a rigid part of the vehicle. These rearwardly bent ends may be of the same section as the front impact surface of the bar, but may be plain surfaced as the essential resides in having the out-facing portion of the bar or impact surface of the advantageous configuration or profile as herein fully described. The impact surface may therefore only extend as shown in Fig. 1, throughout the front, and in the case of a rear bumper throughout the rear aspect, while separately made bar members of different form may be attached to provide the support.

Figure 3:
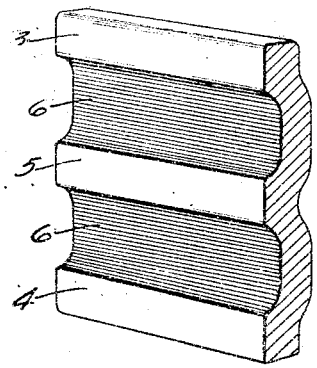
Fig. 3 is a perspective view of a short section of the spring bar member of the bumper, on a larger scale.
Figure 4:
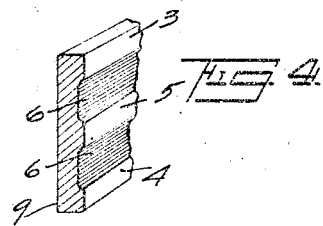
Fig. 4 is a perspective view of a short section of a modified form of a spring bar member of a bumper, on the same scale as that shown in Fig. 2.

As shown in Fig. 4, the back of the bar is flat, and is thus adapted to engage a flat bar that may be used for back support or attaching means for the bumper as a whole. In the form shown in Fig. 3, the profile of the back of the bar corresponds generally to the impact face profile, thus giving a substantially uniform thickness to the bar, which form may be produced by rolling the bumper from a bar originally of uniform thickness.

The main impact or engagement portion of the spring bar of the bumper, that is the profile 2, is formed with the plurality of bands or stripes running lengthwise, that is transverse to the vehicle, for the various purposes and advantages that will now be more specifically set forth. This front surface profile generally of a banded or channel form may be produced by milling flat bar stock, leaving the back surface of the bar plain, or may be formed by rolling the bar, or any other suitable fabricating method when provided with the intermediate surface, between some bands, very slightly offset from the plane of the bands, the more than two bands include one above and one below with an intermediary band or bands preferably all in the same plane, and each much broader than the distance that their plane is offset from the intermediate depressed surface.

This formation of the impact profile of the spring bar provides an area for polishing which is only a fraction of the total surface that would otherwise have to be polished in order to nickel-plate or otherwise uniformly finish the front face of the bar, as in the manner heretofore prevalent.

Having the limited band or striped surfaces in the same plane, the grinding which is an initial operation to prepare the surface for nickel-plating, means that only a small fraction of area requires grinding compared with what was heretofore required for perfectly plain front bars. In addition to the intervening depressed surface between some bands constituting a major portion of the front of the spring bar and lends itself most advantageously to any anti-rusting treatment or to finishing as by enamel in any colors. The grinding and finishing of the bands also assures a uniform demarcation between the finish on the bands and the intermediate surface, thereby permitting facility and cheapness of finish with uniformity in the completed article.

By the formation of the offset bands, to the limit of extent shown and described, the resiliency of the spring bar is not impaired, but stiffness and resistance to indentation or twisting and bending are increased, while at the same time this relatively greater stiffness results with all the desired flexibility, as compared with a heavier bar having a plain front. The relatively protruding bands constitute a protection for the finish such as enameling applied to the intermediate surface, so that in their use substantial advantage in durability of appearance and otherwise, is a practical result in addition to the relative lightness and greater resiliency, as well as strengthening, weight-for-weight as compared with a plain surface bar.

In operation, when used on an automobile, the impact of this improved bumper involves an engagement with any part of another vehicle with the advantage of holding its contact upon impact instead of a tendency to slip up or down, which latter occurs with a plain surface. When such bumper engages the rear bumper of another car of similar profile, or having longitudinally banded contact surface, the engaging bands register with the respective depressed surfaces of the other bumper, thus preventing any tendency to force one of the bumpers up, and consequently minimizing the vertical strain transmitted to the brackets or clamps which secure the bumpers to the relatively rigid parts of the vehicle. This characteristic insures the transmission of the impact more uniformly in a direct line and horizontally to the mass of the vehicle through the rigid parts of the structure best adapted to meet the shock from collision; and also, by preventing the slipping contact of engaging bumpers, minimizes the chance of a front bumper underrunning the rear bumper of a car, or overriding, so that one bumper would strike parts of the vehicle such as gasoline tank or headlights, liable to be seriously damaged. In the case of more than two slightly foreset bands, their engagement with the impact face of the bumper on another car having similar profile, insures a gripping that minimizes the chance of relative vertical movement as compared with other forms of my bumper in which only two offset bands are used. The section of the bars as herein described, while conforming to what may be generally referred to as a "channel" section profile, involves in reality only a very slight depression, that is, a surface-profiling in the direction of the length of the bar. The offsetting of the edges, or the longitudinal portions forming the protruding strips or bands of the impact face, is not such as to constitute a rigid flange that would prevent resiliency. In the preferred form they provide borders or bands of sufficient width for stiffness and for the purpose of accommodating the grinding and the polishing without having the tools therefor interfere with the intermediate surface. Thus as to various objects, simplicity of manufacture results with strengthening of the bar but without impairing the elasticity for the purpose of absorbing the shock and carrying and distributing the strain of impact to the desired substantial parts of the vehicle, without injury. Likewise, protection of radiators and lamps in the front, the tank in the rear, and any highly finished parts of a car proper is assured in addition to relieving all parts of the vehicle of shock.

It will be understood that the production of spring bars involves tempering, and scale due to heat treatment more or less interferes with grinding necessary to condition the surface for plating. In all of this my construction involves a greatly diminished surface requiring grinding, and in practice represents in the neighborhood of a saving of three quarters of the work in finishing the bars as compared with the finishing and nickel-plating of the entire front surface. The intermediate surfaces between the bands may be japanned in any color to match the finish of the other parts of the car, and in any event lends itself to a dull and relatively cheap treatment of the surface for its protection. The intermediate surfaces are, furthermore, partially protected by the slightly protruding bands. Thus, while reducing the cost of production, the use of my invention is advantageous with respect to wearing qualities, with reduced chance of marring of the finish and even maintaining the appearance when intervening surfaces or bands are slightly marred, thus reducing the necessity of frequent refinishing. In case of accident, the intermediate surfaces may be readily reenameled without removing the bar, while the polished bands maintain their appearance owing to their finish radically contrasting with the intermediate dark or colored surfaces of relatively dull finish.

While various modifications may be made from what is herein shown and specifically described, without departing from the spirit of my invention, what I claim and desire to secure by Letters Patent is:

1. In spring impact bars for automobile bumpers, an impact surface having at its top and bottom flat surface impact face bands in the same vertical plane, a medial flat face impact band in the same vertical plane, and intermediate impact surface areas between said bands slightly set back from the plane of the bands.

2. An automobile bumper having a spring impact bar with more than two flat surface impact face bands parallel with the length of the bar, intermediate impact surface areas between said bands slightly back-set from the surface of the bands.

3. A spring impact bar for automobile bumpers consisting of a flat bar having its impact side formed to a profile with more than two flat impact face bands of an aggregate width of more than one-quarter of the total width of the bar, and intermediate impact faces offset from the plane of each band surface a fractional extent of the thickness of the bar.

4. An automobile bumper comprising a resilient transverse impact bar thin compared with its breadth vertically, and means for securing said bar in impact position at the end of an automobile, an impact face the full breadth of the bar having more than three parallel smooth finished surface strips extending longitudinally of the bar and unfinished areas of impact surface adjacent said smooth finished strips offset from the surface of the strips an extent equal to a small fraction of the thickness of the bar and having some of said smooth strips of the width approximating the thickness of the bar.

In testimony whereof, I have signed my name to this specification, this 12 day of August, 1926.

SAMUEL H. SHAW.